(12) United States Patent
Smith

(10) Patent No.: US 6,986,576 B2
(45) Date of Patent: Jan. 17, 2006

(54) DEFORMABLE LENS FOR ADJUSTABLE EYE GLASSES

(75) Inventor: S. Gregory Smith, Yorklyn, DE (US)

(73) Assignee: Cloud Farm Associates, LP, Yorklyn, DE (US)

( * ) Notice: Subject to any disclaimer, the term of this patent is extended or adjusted under 35 U.S.C. 154(b) by 28 days.

(21) Appl. No.: 10/363,887

(22) PCT Filed: Feb. 8, 2002

(86) PCT No.: PCT/US02/03889

§ 371 (c)(1), (2), (4) Date: Mar. 10, 2003

(87) PCT Pub. No.: WO02/063374

PCT Pub. Date: Aug. 15, 2002

(65) Prior Publication Data

US 2003/0169399 A1 Sep. 11, 2003

Related U.S. Application Data

(60) Provisional application No. 60/267,238, filed on Feb. 8, 2001.

(51) Int. Cl.
*G02C 1/08* (2006.01)

(52) U.S. Cl. ............................. 351/95; 351/41; 351/90; 351/92

(58) Field of Classification Search ........... 351/90–101, 351/41, 158
See application file for complete search history.

(56) References Cited

U.S. PATENT DOCUMENTS

| | | | | |
|---|---|---|---|---|
| 4,135,792 A | * | 1/1979 | Deeg et al. | 351/41 |
| 4,360,252 A | * | 11/1982 | Solomon | 351/95 |
| 4,418,990 A | * | 12/1983 | Gerber | 351/41 |
| 5,293,185 A | * | 3/1994 | Berger et al. | 351/95 |
| 5,774,274 A | * | 6/1998 | Schachar | 359/666 |
| 6,273,564 B1 | * | 8/2001 | Wedeck et al. | 351/92 |

* cited by examiner

*Primary Examiner*—Hung Xuan Dang
(74) *Attorney, Agent, or Firm*—Huntley & Associates, LLC

(57) ABSTRACT

Eye glasses including a frame containing deformable lenses within the frame, the frame including means for deforming the lenses or changing the focal length of the lenses to enhance the wearer's ability to see clearly.

9 Claims, 4 Drawing Sheets

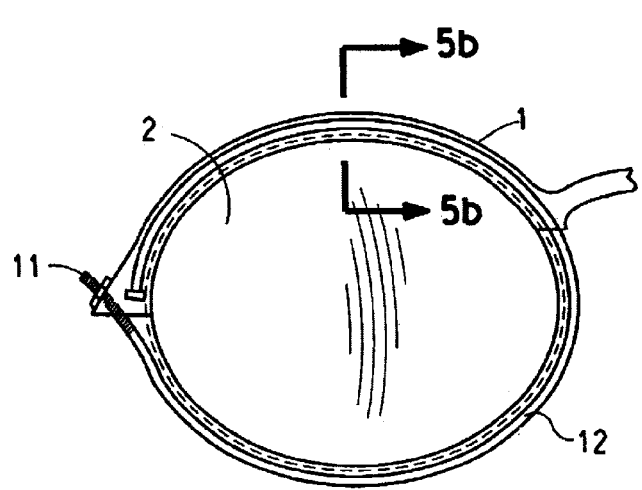
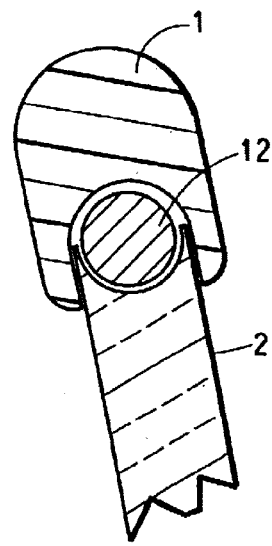
FIG. 5a  FIG. 5b
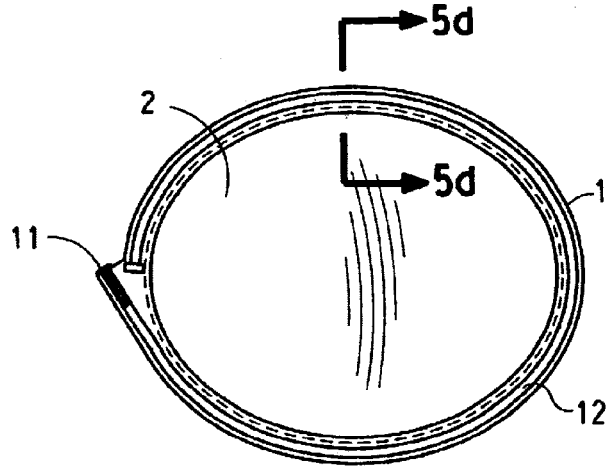
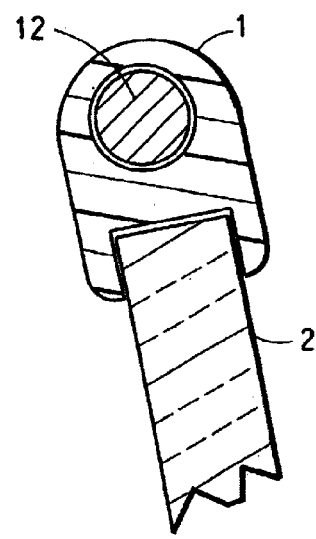
FIG. 5c  FIG. 5d

DEFORMABLE LENS FOR ADJUSTABLE EYE GLASSES

CROSS-REFERENCE TO RELATED APPLICATIONS

This application is 35 U.S.C. 371 of PCT Application No. PCT/US02/03889 with an international filing date of Feb. 8, 2002, published in English under PCT Article 21 (2) which claims priority of Provisional Application No. 60/267,238 filed Feb. 8, 2001.

BACKGROUND OF THE INVENTION

This invention relates to deformable lenses, particularly for use in eyeglasses for older people.

About the age of 40, many individuals, who had perfect vision at all distances, find that their near vision is fading and their distant vision is also showing signs of weakness. The reason is not usually illness or accident. About the age of 40, the lens of the eye, which adjusted its form naturally, dependent upon the distance of the object being viewed from the viewer and the size of his or her pupil, has doubled in size and increased its density about five times since birth. In other words, most peoples' lenses no longer have the flexibility or maneuverability that they had in their younger years.

Benjamin Franklin initially prescribed bifocals for this problem. Trifocals were later added. Recently, blended bifocals have been developed. This type of lens has the power difference, usually an increased power of 2.50 diopters blended so that there are no lines and the power changes gradually. By tipping the head, wearers can choose which lens or power they want to use.

The problems that exist with these solutions include poor vision walking down steps (the power in the lower portion of the glasses is for 16 inches); reading at a desk (the width of the bifocal in the blended bifocal is narrow in width and the reader has to turn his or her head to read instead of just using the eyes); and the power of the reading glasses one may be wearing may not be strong enough for the task at hand, i.e., much greater magnification is necessary resulting in the individual substituting a stronger pair of glasses.

It is recognized in the medical community that near-sighted or far-sighted persons who wear bifocals have approximately three feet of uncorrected space between the power correction of the near lens and the correction of the far lens. This uncorrected space results in blurry vision for such wearers of bifocals. Responding to this problem, wearers usually attempt to displace bifocals fore and aft in front of their faces. Usually such displacement covers approximately a distance between a quarter inch and a maximum of approximately one inch before wearers feel comfortable. In response to this problem, quite a few attempts dealing with adjustable frames for a pair of eyeglasses have been made.

Thus, U.S. Pat. No. 5,162,824 to Klemka discloses an adjustable lens spectacle including a rigid front frame and a slidable rear frame mounted parallel thereto. The rear frame is provided with a drive motor contained within a respective temple leg, and a drive means coupling the motor with the rear frame for effecting reciprocation of the rear frame relative to front frame. The frame is further provided with a reversing switch mounted outside the frame. A distance at which the rear frame travels is grossly inadequate to compensate for the uncorrected space mentioned above. Further, a cross plate serving as a guide for the rear frame is esthetically unappealing because the displaceable frame cannot fit the front frame, thereby increasing the overall size of the disclosed pair of eyeglasses. Typically, a wearer of the assemble pair of eyeglasses would experience considerable inconvenience because the overall structure is neither compact nor light.

Another known device for aiding vision of images, primarily for magnifying a television picture, includes a pair of spectacles, comprising eye-piece lenses mounted in a frame, and binocular objective lenses disposed in front of each eye-piece lens and supported by an extension to the frame of spectacles. The device further has a means for displacing objective lenses along the optical axis.

U.S. Pat. No. 3,659,931 discloses an eyeglass frame having a manually adjustable means for individually moving each lens toward and away from the wearer's eye to vary the lens-eye separation for optimum focus.

In a recent patent, U.S. Pat. No. 6,076,927, Owens has provided a pair of eyeglasses adapted to vary a focal length between the lens of the glasses and the wearer's eyes to compensate for uncorrected space that occurs for near sighted persons wearing bifocals. According to Owens' invention, the lenses are movably mounted upon a frame which is stationary on the wearer's faces. Located on each temple piece of the frame is an actuator adapted to displace the eyepieces up to one inch from the wearer's eyes.

SUMMARY OF THE INVENTION

The present invention provides a relatively simple structure of a pair of eyeglasses that eliminates the inconveniences and complicated modifications of the prior art in attempting to correct the problems associated with aging of an individual's lenses.

The invention comprises the use of deformable plastic lenses, the shape or curvature of which can be changed and thus alter the power or focal length of the lenses to enhance the wearer's ability to see clearly at all distances from reading (at about 16 inches) to looking at steps on the ground (at about 60–70 inches) to looking at signs and distant landscapes at infinite distances.

Specifically, the present invention provides eyeglasses comprising:
  a. means adapted to secure at least one deformable lens in front of an eye; and
  b. means to deform the lens in such manner as to make the lens suitable for either short- or long-distance viewing.

The present invention further provides a method for viewing comprising passing an image through a deformable lens situated in front of an eye; and deforming the deformable lens to alter the focal distance of the image passing therethrough.

BRIEF DESCRIPTION OF DRAWINGS

FIGS. 5a, 5b, 5c and 5d are views of still other embodiments of the invention, in which a circumferential wire is provided to deform the lens.

DETAILED DESCRIPTION OF THE INVENTION

In general, a round lens is best suited to the present invention, although other shapes can also be used. The lens is composed of a deformable plastic material. A wide variety of known materials can be used, including, for example, silicones, acrylic polymers such as polymethyl methacrylate, and fluorocarbon polymers. The degree of polymerization and the treatment during preparation of such polymers is sufficient to provide a flexible, tough, non-brittle materials. The adjustment of these variables is known to those skilled in the art. The deformable lens rests in a frame and an individual can deform the lens within the frame using a variety of adjusting means provided. A mechanism attached to the frame is adapted to compress the perimeter, and thereby deform the lens in such a manner that by its adjustment the lens is compressed in the frame, and it would have more curvature and thus more power. By adjusting the mechanism in the opposite direction to relax the pressure on the lens, the lens would flatten, have less power and be suitable for long distance viewing.

The deformation of lens results in an alteration of the performance characteristics of the lens. As can be recognized, this alteration can change the focal length or distance of the lens, or change its power. Deformation can also result in a change of the sphericity of the lens in at least part of the lens. By viewing an object through a portion of the lens for which the sphericity has been so altered, different viewing capabilities will be realized.

Figure 1:
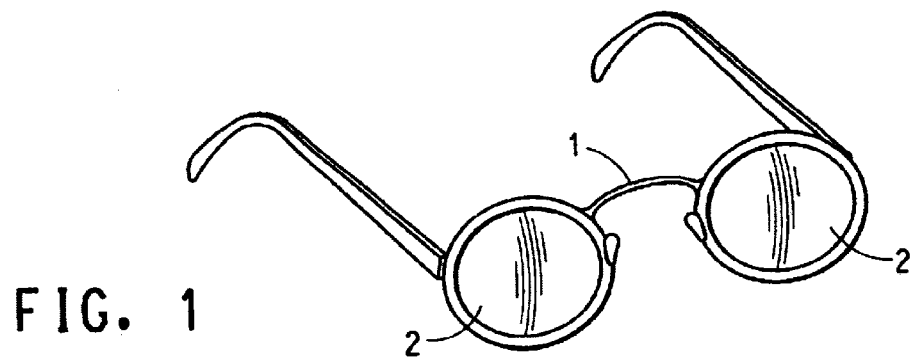
FIG. 1, is a view, in perspective, of a pair of eyeglasses containing deformable lenses and a deforming mechanism of the present invention.

The invention will be more fully understood by reference to the drawings. In FIG. 1, the eyeglasses include a frame 1 and a pair of focal lenses 2 in the frame. It should be understood that the eyeglasses according to the invention may have limitless specific designs within the basic design parameters that the eyeglasses should be aesthetically appealing and practical in every day use. In other words, the eyeglasses according to the invention should be light, compact and reliable. Thus, the lenses are typically and preferably made of a deformable thermoplastic, such as acrylics and silicones. Many of the mechanical parts can be made of elastomeric material. Preferably, the frame parts are composed of injection-molded components.

Figure 2:
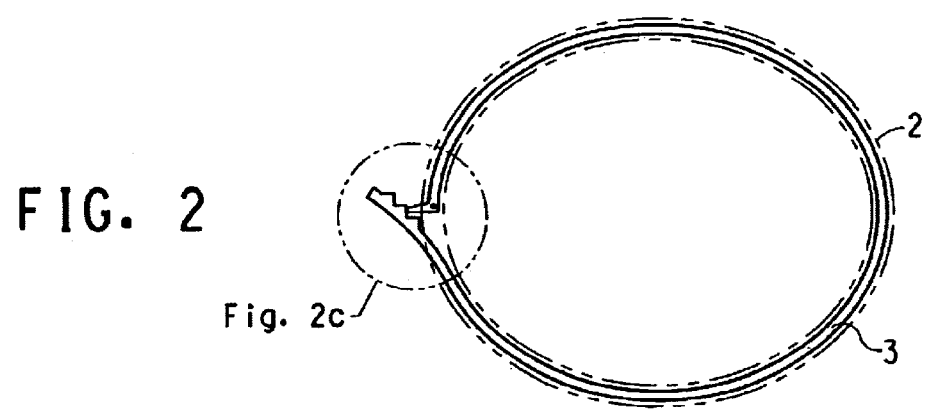
FIGS. 2, 2a, 2b and 2c are views of a lens which can be used in the present invention, surrounded by a cable to deform the lens and one mechanism for adjusting the cable to deform the lens.
Figures 2A, 2B, 2C:
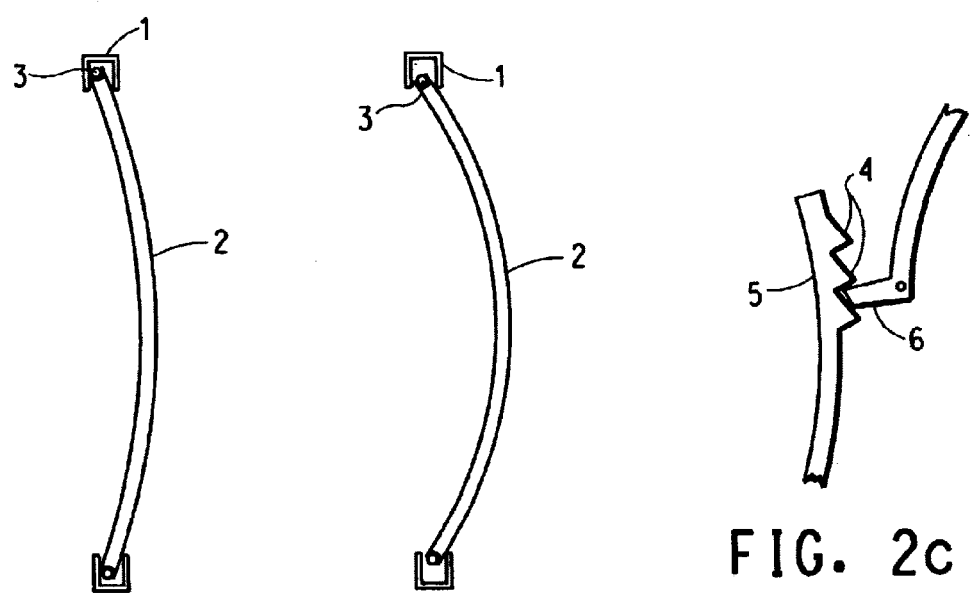

The adjustment of the lenses according to the present invention is carried out by adjustment of the peripheral force on the lens, causing an increase or decrease of the curvature of the lens. A wide variety of techniques can be used for this force adjustment. For example, as shown in FIG. 2, a cable 3 is used around the circumference of the lens, placed either surrounding or embedded in the perimeter of the lens. Notches 4 are provided in cable end 5 as shown in the enlarged view shown in FIG. 2c. These notches can catch on tang 6 on the eyeglass frame as adjustments are made. In an alternative embodiment, not shown, adjustment can be made continuously made by a pulley or gear system on the cable with a friction lock. FIG. 2b shows the lens in compressed position, with greater curvature. FIG. 2a shows the lens in a relaxed position, with less lens curvature.

Figure 3:
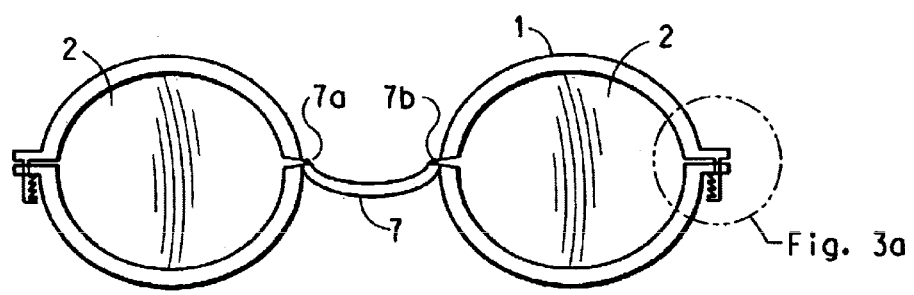
FIGS. 3, 3a, 3b and 3c are views of glasses and views of the lenses in relaxed and deformed shapes and one mechanism for adjusting the deformation of the lenses.
Figure 3A:
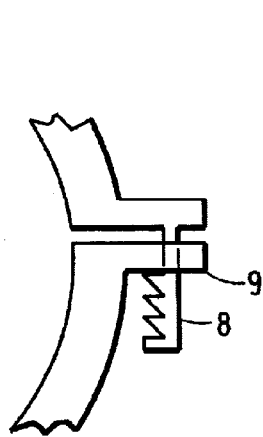
Figure 3B:
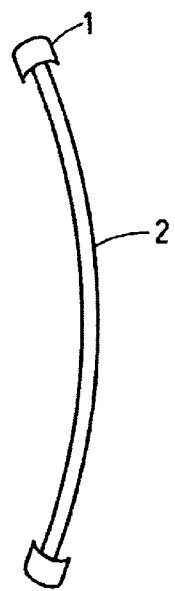
Figure 3C:
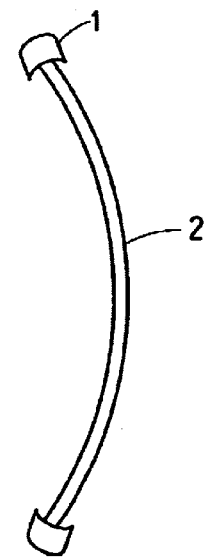

Another embodiment shown in FIG. 3 employs a metal frame hinged at the nosepiece 7 at hinge points 7A and 7B. Such hinging is especially advantageous for rigid frame materials, but generally not needed for more flexible frame materials. The frame is opened temporally and has a vertical member 8 shown in FIG. 3A which has notches formed therein. These notches catch on frame end 9 to adjust the lens to the curvatures shown in FIGS. 3b and 3c.

Figure 4A:
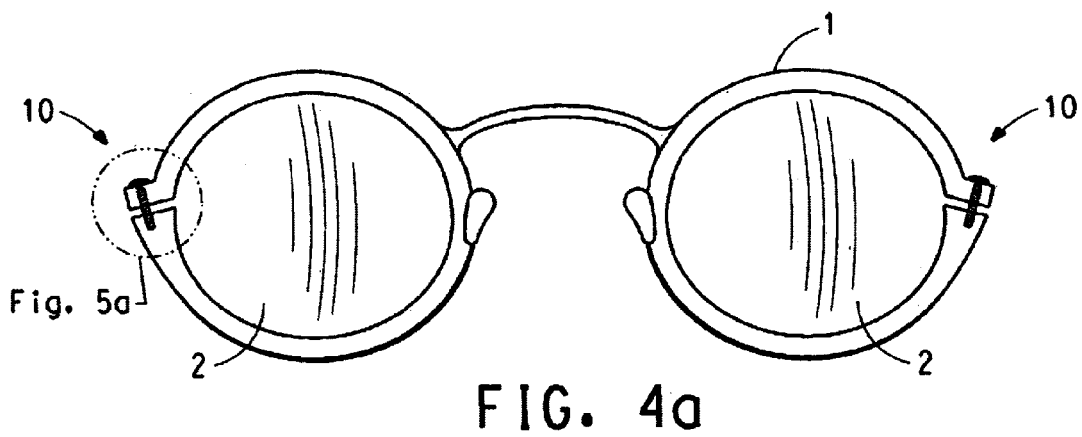
FIGS. 4a, 4b and 4c are views of another embodiment of the invention.
Figure 4B:
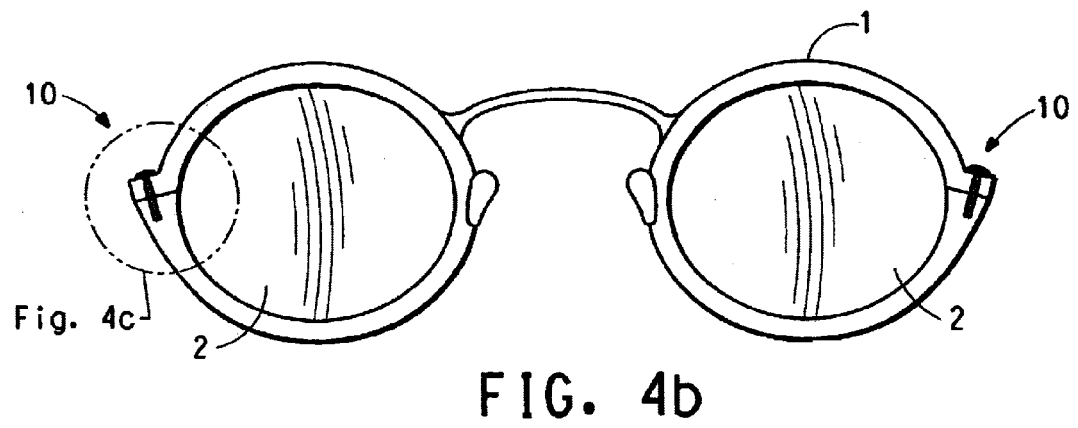
Figure 4C:
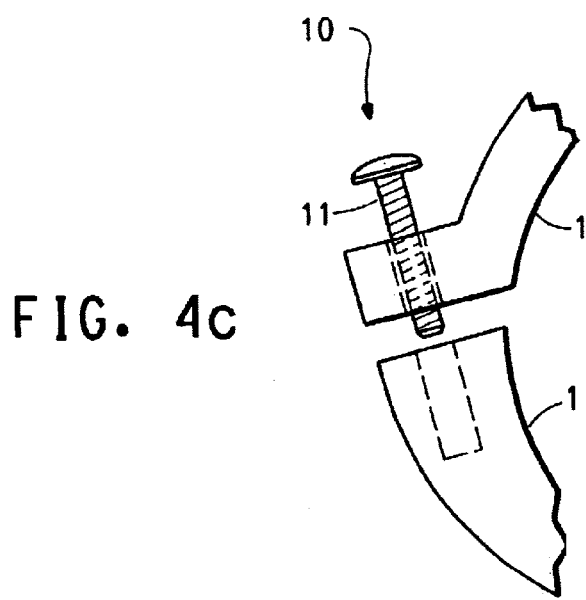

Another alternative embodiment of the invention is shown in FIG. 4, in which a screw mechanism 10 is provided in an eyeglass frame to make the adjustments. FIGS. 4a and 4b show the mechanism in a relaxed and tightened configuration, respectively. Rotation of screws 11 opens or closes the temporal gap in the frame, relaxing or compressing lenses 2. This embodiment is shown in enlargement in FIG. 4c.

Still another alternative embodiment of the invention is shown in FIGS. 5a–5d. FIG. 5a is a frontal plan view of an eyeglass lens 2 with a perimetral adjusting wire positioned on the circumference of the lens and partly within top frame 1. This embodiment of the invention is shown in cross-section in FIG. 5b, taken at section 5b—5b in FIG. 5a. A variation of this embodiment is shown in FIG. 5c, in which the adjusting wire is fully embedded within the frame. FIG. 5d is a cross-sectional view of FIG. 5c, taken at section 5d—5d.

In both of these variations, rotation of screws 11 adjusts the tension on the perimetral cable, increasing or decreasing the curvature of the lens. By using the frame surrounding the lens to compress the lens or relax tension on the lens, the curvature (and thus the focal length) of at least a portion of the lens can be altered to correct the individual's ability to see clearly.

In a more sophisticated embodiment of the invention, a sensing device is provided to monitor the size of the pupil or the location of the eye. When the eye focuses at close distances, the eyes turn inward and pupil becomes constricted. By monitoring one or both of these parameters, the sensing device through a computer causes a motor to adjust the curvature of the lenses, making manual input unnecessary. The computer, battery, and the linkage can be located in the earpieces. Also, since computers are now available with an air link (as in "Apple" computers) to the Internet, a remote system that includes a computer on a distant desk or on the person can be used to integrate these functions.

In still another embodiment of the present invention, temperature changes can be used to change the shape of the lenses. Thermoplastics are temperature-sensitive and, thus, heating or cooling thermoplastic lenses through the frame of the eyeglasses would cause a shape change in the deformable lens, resulting in a corresponding change in the focal length of the lens. Alternatively, heating and cooling a frame of thermoplastic can deform a lens held within the frame.

I claim:

1. Eye glasses comprising:
   a. means adapted to secure at least one deformable lens in front of an eye; each having a concave front side and a convex rear side and
   b. means to deform the lens in such manner as to make the lens suitable for either short or long-distance viewing.

2. An eyepiece comprising:
   a. a deformable thermoplastic lens, the lens having a concave front side and a convex rear side; and
   b. means to deform the lens in such manner as to make the lens suitable for either short- or long-distance viewing.

3. An eyepiece of claim 2 wherein the means to deform the lens compresses or relaxes the lens.

4. Eye glasses of claim 1 wherein the means to deform the lens is a frame responsive to temperature change and in which an increase in the temperature results in deformation of the lens.

5. A method for viewing comprising passing an image through a deformable lens situated in front of an eye, the lens having a concave front side and a convex rear side; and deforming the deformable lens to alter the focal distance of the image passing there through.

6. A method for viewing comprising passing an image through a deformable lens situated in float of an eye, the lens having a concave front side and a convex rear side; and deforming the deformable lens to alter the power of the lens.

7. A method for viewing comprising passing an image through a deformable lens situated in front of an eye, the lens having a concave front side and a convex rear side; and deforming the deformable lens to alter the sphericity of the lens.

8. Eye glasses comprising:
a. a frame adapted to contain at least one lens;
b. at least one deformable lens adapted to fit within the frame, each lens having a concave front side and a convex rear side;
c. means to deform the at least one deformable lens in such manner that by its adjustment the lens is suitable for either short- or long-distance viewing.

9. Eye glasses of claim 8 wherein the means to deform the lens compresses or relaxes the lens to provide more or less curvature.

* * * * *